Figure 1:
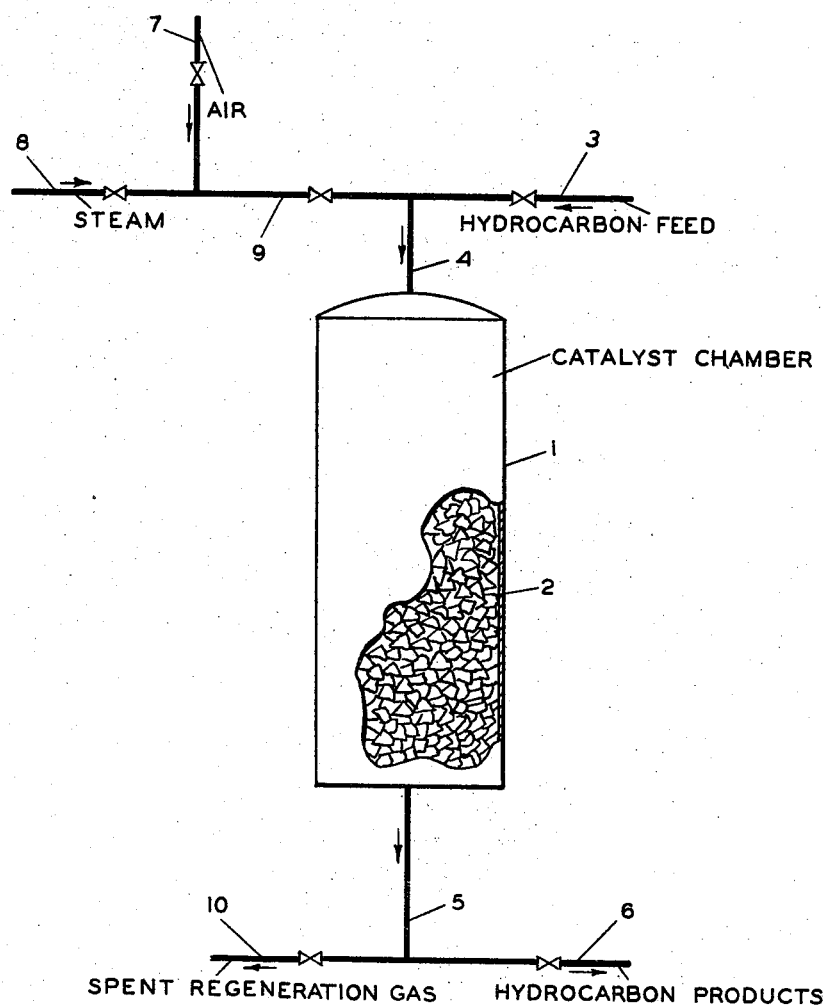

Nov. 30, 1948.                R. E. VINYARD ET AL                 2,454,901
             CONTROL OF TEMPERATURE IN REGENERATION OF
               SOLID HYDROCARBON CONVERSION CATALYSTS
Filed June 24, 1944                                      3 Sheets-Sheet 1

INVENTORS
R.E. VINYARD
BY   W.W. ROACH
     BRADLEY SKINNER
Hudson, Young
     ATTORNEYS

TOTAL STEAM REQUIREMENT VS. CARBON CATALYST RATIO

TEMPERATURE INCREASE VS. CARBON CONCENTRATION
FOR VARIOUS AIR-STEAM RATIOS

Patented Nov. 30, 1948

2,454,901

UNITED STATES PATENT OFFICE 2,454,901

CONTROL OF TEMPERATURE IN REGENERATION OF SOLID HYDROCARBON CONVERSION CATALYSTS

Roy E. Vinyard and Wendell W. Roach, Borger, Tex., and Bradley Skinner, Bartlesville, Okla., assignors to Phillips Petroleum Company, a corporation of Delaware Application June 24, 1944, Serial No. 541,922

5 Claims. (Cl. 196—52)

The present invention relates to organic chemical conversion reactions conducted at elevated temperatures in the presence of solid contact material and particular'y to such conversions wherein carbonaceous or other combustible material is deposited on said contact material, and wherein said carbonaceous deposits are periodically removed by combustion thereof.

In a preferred aspect, the present invention relates to the catalytic conversion of organic materials such as hydrocarbons by contact at conversion temperatures with beds of catalytic material, and in which carbonaceous material deposited on the cata'yst during the conversion process is removed by burning or combustion in a regeneration process. The conversion referred to may be any reaction which will result in the deposition of carbonaceous deposits on the contact material or catalyst, and in which said contact material or catalyst may be revivified or renewed in activity by combustion of said deposits. Such reactions may include cracking, dehydrogenation, polymerization, reforming, cyclization or, in general, reactions for decomposition, conversion, or synthesis of organic materia's, particularly as applied to treatment of hydrocarbons. It may be also applied to conversions wherein the reaction is essentially thermal and conducted in the presence of inert solid contact material, but in which deposited carbon on the solid contact material makes periodic regeneration desirable.

In the operation of fixed bed catalytic cracking or other hydrocarbon conversions of the type described herein, wherein regeneration by combustion of carbon is carried out, it is important to maintain or remain below a substantially fixed predetermined maximum regeneration temperature. This is because each catalyst generally has a given maximum temperature, which, if exceeded, would adversely affect the activity or physical properties of the catalyst or both. Thus temperature control during regeneration is extremely important for this reason alone, since, otherwise, cost of rep'acement of catalyst would be prohibitive. At the same time, however, it is frequently desirable to regenerate at the highest temperature consistent with safety of catalyst from harm, since at such temperatures combustion is more rapid and efficient. It is also important to control temperatures in order to maintain as far as possible uniform combustion conditions to permit the use of equipment designed for particular temperatures, and to enable the use of economic regeneration conditions in general.

In order to maintain temperatures of combustion within desired limits, and to permit ready control of the regeneration reaction, it is frequently desirable to utilize various inert diluents, such as steam or flue gas, in order to remove heat of combustion. In prior art processes, such diluents are used more or less by rule of thumb, that is, if the temperature rises in the catalyst bed or in a particular portion thereof, additional diluent is introduced to control the temperature rise. It is obvious that to permit temperatures to rise excessively, and to then attempt to control these temperatures by injection of large vo'umes of diluent, requires complex control means and, since the remedy is applied only when temperature has begun to rise, the time lag involved frequently makes the expedient ineffective to give a smooth temperature curve during regeneration or to prevent undesired temperature peaks from being present in the regeneration zone. Use of diluent in this manner is also inefficient and uneconomical, since to obtain temperature control with present processes without the use of indirect heat exchange as well would require excessively large volumes of diluent, thus wasting fuel and power. The use of indirect heat exchange as the sole means of control is inefficient and usually requires complex equipment. On the process portion of the cycle, carbon deposited on the catalyst is a measure of the length of the cycle or volume of material converted, as well as an indication of the depth of conversion. Various amounts of carbon may be deposited, but, in accordance with the prior art, as more specifically referred to herein, short process cycles and low carbon deposits are desired. The ultimate permissible carbon concentration which may be laid down on catalyst during the conversion reaction is that at which the activity of the catalyst in promoting the desired reaction is materially affected. This concentration will be variable in accordance with the particular catalyst used.

In conventional processes for the conversion of hydrocarbons by contact with catalyst beds at elevated temperatures, as in catalytic cracking using fixed beds of catalyst, a plurality of catalyst chambers is provided so that while one or more are on the process portion of a cycle, one or more will also be simultaneously on the regeneration portion of the cycle, during which carbonaceous material is burnt off by combustion with an oxygen-containing regeneration gas. In carrying out these prior processes, the problem of temperature control during regeneration has been the subject of considerable study and discussion, since it has been found that excessive temperatures tend to occur in the catalyst bed during regeneration. To solve this problem of temperature control, it has been believed necessary to provide indirect heat exchange in the regeneration zone, as by the use of tubes inserted in the bed, through which heat exchange or cooling material flows during regeneration. It has also been believed necessary to operate the onstream or process portion of the cycle for relatively short periods of time so as to lay down a certain maximum concentration of carbon on the catalyst in order to avoid generation of excessive amounts of heat during the regeneration reaction. In fact, it has been stated that satisfactory operations cannot be carried out when the on-stream portion of the cycle lays down a coke deposit of greater than 15 grams per liter of catalyst or that the burnable deposits should not be greater than 1% by weight of the catalyst mass, with on-stream periods of between five and fifteen minutes. Larger carbon deposits and longer process periods have also been described, but usually in such cases the problems of efficient regeneration have been ignored, or unusual and uneconomical expedients have been employed in order to control the regeneration temperatures.

Certain regeneration operations of the prior art attempt to control temperatures at a desired maximum by addition of relatively cold diluent to the combustion zone after the temperatures have begun to rise. In order to do this effectively, the diluent must be added in progressively increasing amounts throughout the regeneration. This is a wasteful and difficult procedure. The prior art has also believed that increasing catalyst volumes or increased ratios of catalyst to oil would function to maintain temperatures by virtue of the fact that the larger catalyst volumes were believed to absorb heat of regeneration. For self-controlled fixed catalyst beds, without the use of extraneous heat exchange means, this procedure has been found to be inapplicable for reasons hereinafter described.

Other patents illustrative of the prior art attempt to control regeneration temperatures by varying the oxygen concentration, or air-diluent ratio, in accordance with temperature changes which take place within the bed during regeneration. This necessitates use of and reliance on, temperature recording instruments which at best are not completely accurate and record merely the condition of individual points in the bed. For beds of large size such records may obviously not indicate the true state of the bed. Mechanical and electrical controls are also subject to frequent disturbance which may render them inoperative during a crucial period, thus throwing a whole cycle out of balance and disrupting continuous operations.

In general, the art of catalytic cracking in solid catalyst beds has been hampered in its development due to the fact that processes now known or in use have been required to use short process periods, low carbon deposits and complex systems for heat exchange or temperature control.

Following extensive investigations of the phenomena occurring in catalyst beds during regeneration, the present inventors discovered that under certain conditions abnormal increases in temperature occurred during regeneration and that unless prompt and vigorous temperature control measures were taken, these temperatures tended to run away and to rise far beyond those desirable during regeneration and above those at which the catalyst activity would remain unimpaired. The temperatures obtained during regeneration were usually found to greatly exceed those calculated from the oxygen concentration of the regenerating gas and the carbon concentration on the catalyst. It was further found that this abnormal temperature is apparently due to the fact that in a given catalyst bed, combustion actually occurs in a relatively narrow zone at the point of initiation of combustion, and that this zone moves progressively through the catalyst bed in the direction of flow of regenerating gas. As a result of this, each segment of the bed in which combustion has taken place serves to preheat regeneration gas approaching each successive combustion zone. The regeneration gas entering each combustion zone, therefore, substantially achieves the combustion temperature in the previous zone, thus resulting in successively higher combustion temperatures. Unless this is controlled, the maximum temperature will tend to approach an equilibrium temperature which may be very much higher than that which the catalyst can stand and which would require substantial waste of cooling material to control and to reduce to a temperature approaching that required for the conversion reaction.

It was further noted that apparently after mild cracking conditions the regeneration temperatures tended to rise abnormally as regeneration progressed over and above the initial regeneration temperature, thus presenting a problem requiring the use of large and uneconomical volumes of diluent. After more severe cracking conditions, it was found that burning temperatures were more readily "lined out" near the initial combustion temperatures, using proper proportions of diluent and oxygen in the regenerating gas, as determined in accordance with the present invention.

Applicants have now discovered that a definite relationship exists between a desired maximum regeneration temperature, carbon concentration of catalyst to be regenerated, and oxygen concentration of regenerating gas or ratio of diluent to air or to carbon, and that this relationship may be defined in terms of a definite mathematical expression. In accordance with this expression, it is possible to predetermine the various factors which will permit automatic internal temperature control while at the same time permitting the selection of such factors as oxygen concentration and carbon concentration, which will give optimum and practical operating conditions for any given catalyst and for any desired conversion conditions during the process period.

In accordance with the present invention, it has also been found possible to more readily and accurately carry out the regeneration with substantially automatic internal control of maximum regeneration temperatures for any given set of conditions, provided that a certain minimum carbon concentration is deposited during the process portion of the cycle and provided further that there is proper coordination of the ratios of the heat capacities of diluent and catalyst with the maximum desired temperature as well as said minimum carbon concentration. Contrary to the teachings of the prior art, low concentrations of carbon below said minimum are frequently undesirable and require unnecessarily complex and uneconomical methods for temperature control. In accordance with the present invention carbon concentrations on the catalyst greater than those in use in the prior art have been found to permit optimum regeneration conditions to be used, provided other conditions of regeneration are coordinated as described herein. As a corollary to this, it has been found possible and even desirable to operate the process portion of the cycle for long periods of time, the only limitation being the carbon concentration at which the activity of the catalyst is materially affected. In actual practice, process periods of 3 to 6 hours or longer, may now be utilized with consequent savings in manpower, equipment, and diluent and purging materials.

It is therefore, an object of the present invention to provide a hydrocarbon conversion and regeneration process in which catalyst regeneration temperatures are inherently self-controlled.

It is a further object of the present invention to describe a catalytic hydrocarbon conversion process which permits long process periods and deposition of substantial quantities of carbon, while at the same time permitting simple and effective regeneration at predetermined maximum temperatures, without the necessity for extraneous temperature controls.

It is a still further object of the present invention to describe a mathematical relationship between the carbon concentration, maximum regeneration temperature, and oxygen concentration of regeneration gas, so that the operator of a regeneration process may be enabled, by utilizing said expression, to predetermine the critical operating conditions under which the regeneration will function.

It is a still further object of the present invention to provide a catalyst regeneration process which will permit operation at optimum temperatures while at the same time insuring against impairment of catalyst by overheating.

Another object of the present invention is the description of a catalytic conversion process wherein the frequency of regeneration is substantially reduced and the consequent necessity for frequent purging is also reduced. Furthermore, since a given catalyst will withstand a certain number of regenerations before substantially losing its activity, the total life of catalyst is substantially increased.

More specifically, it is an object of the present invention to describe a combination conversion and regeneration process in which diluent and air mixtures are used for regeneration of catalyst beds and in which temperature control at a maximum desired regeneration temperature is obtained by correlating carbon concentration of catalyst prior to regeneration, with the temperature desired and the proportion of diluent and air in the regenerating gas.

It is a further object of the present invention to describe a mode of regeneration in which a given fixed diluent-air ratio, or oxygen concentration may be predetermined for use throughout said regeneration, whereby a given maximum regeneration temperature will not be exceeded for given carbon concentrations on the catalyst, without the necessity for other temperature control expedients.

Further objects of the present invention will appear from the description thereof, which follows.

Applicants have discovered that the relationship between the essential factors involved in the regeneration reaction may be expressed by the equation:

(1) $$\frac{C}{S} = \frac{\frac{h_S}{h_D}}{\frac{D}{C} - \left[\frac{Q - K\Delta T}{h_D \Delta T}\right]}$$

In this equation C=weight of carbon; S=total weight of catalyst; $h_S$=specific heat of the catalyst; $h_D$=specific heat of diluent; D=weight of diluent; Q=heat of combustion of carbon; K=a constant which may be determined from the expression $$K = h_F \frac{F}{C}$$

where $h_F$ is the specific heat of flue gas or spent regeneration gas emerging from the combustion zone, F is the volume of flue gas resulting from the combustion of A volume of air required to burn C weight of carbon, or F=A in volume; $\Delta T$=the temperature difference between the maximum burning zone temperature (regeneration temperature) and the temperature at which regeneration is initiated, which would ordinarily be the temperature at which the regeneration gas enters the regeneration zone, and assumes that the catalyst is initially at substantially the temperature of the regenerating gas or that there is substantial temperature equilibrium between gas and catalyst at the point where regeneration is initiated. The temperature at which the regeneration gas enters the regeneration zone is maintained substantially constant during the regeneration or reactivation. K is determined on the assumption that the carbon is substantially burned to $CO_2$ in the combustion zone. The specific heat of flue gas may be taken as about 0.021, and assuming 150 cubic feet of air required to burn one pound of carbon, which will produce 150 cubic feet of flue gas, $$K = \frac{0.021 \times 150}{1} = 3.15$$

This figure for K is used in the calculations contained herein. The equation referred to above may of course be calculated in other units or on a unit time basis.

In the above equation, therefore, it is apparent that $$\frac{C}{S} \times 100$$

represents the per cent of carbon on the catalyst, while D/C represents the amount of diluent required for a unit of carbon burned. The equation in question actually may represent three or less variables. $\Delta T$ is determined by the desired maximum regeneration temperature and by the inlet temperature of the regeneration gas. The maximum permissible temperature is also dependent on the particular catalyst. For bauxite, regeneration temperatures may run as high as 1600° F. or more. For some silica-alumina or other synthetic gel-type catalysts, the maximum may be about 1200° F. while certain types of silica alumina may satisfactorily withstand regeneration temperatures of about 1400° F. For clay-type catalysts, such as acid-treated bentonite, the maximum may be between 1150 and 1250° F. If it is desired to regenerate at or near the maximum temperature which the catalyst can withstand, this would leave the carbon concentration and quantity of diluent required as unknowns. For any carbon lay-down, which is determined by length of cycle and extent of conversion during the process portion of the cycle, the quantity of diluent required in the regeneration gas, which, if continuously introduced into a given catalyst bed during regeneration may be calculated. This will give the amount of diluent in the regeneration gas which if continuously introduced into a catalyst bed during regeneration will permit regeneration to take place without substantially exceeding the predetermined maximum temperature expressed by $\Delta T$, with the temperature of the entering regeneration gas also held constant.

The factors correlated by the above equation are effective for catalyst beds having a length greater than the depth of a single combustion zone. Under conditions which would ordinarily be used, it has been found that each combustion zone varies in depth from about 1 to 6 inches, thus in ordinary practice this equation would be applied to beds more than 6 inches in depth.

Where $\Delta T$ is known and it is desired to use a given diluent concentration, by solving for $C/S$, the carbon lay-down, and hence the length of process period, may be determined. This will give the carbon concentration on the catalyst, which, for a given constant diluent concentration of the regeneration gas, during the regeneration, will permit regeneration to be carried out without substantially exceeding a maximum temperature expressed by $\Delta T$.

Where the carbon lay-down and diluent concentration are both known, the $\Delta T$ which will be achieved during regeneration may be determined. In this manner, it can be ascertained whether the desired operations are likely to reach temperatures which will affect the activity of the catalyst, and from the same factors the inlet temperature the regeneration gas should have may be determined. By means of this correlation, temperature control may be achieved without varying the temperature of the incoming gas.

Another important function of the present invention is that the determination of the carbon-catalyst ratio which should be obtained for a given diluent ratio and $\Delta T$, permits the determination of length of process period. For example, a plant processes 100,000 pounds of feed per day under conversion conditions which will transform 1% of the feed to carbon, or 1,000 pounds per day. A pair of catalyst cases is to be used, each of which contains 4,000 pounds of catalyst, and each of which is in use half of the time and on regeneration the other half. This gives 4,000 pounds of catalyst in use continuously. Calculation according to the equation, or from curves previously drawn from the equation, shows that 5% carbon may be laid down to maintain the desired $\Delta T$, or in other words 200 pounds per cycle. This gives 5 cycles per 24 hours or 4 hours and 48 minutes per cycle.

It has been found, as will be hereinafter more fully described, that the above equation may be satisfactorily utilized when the carbon concentrations selected are above a certain minimum.

Figure 2:
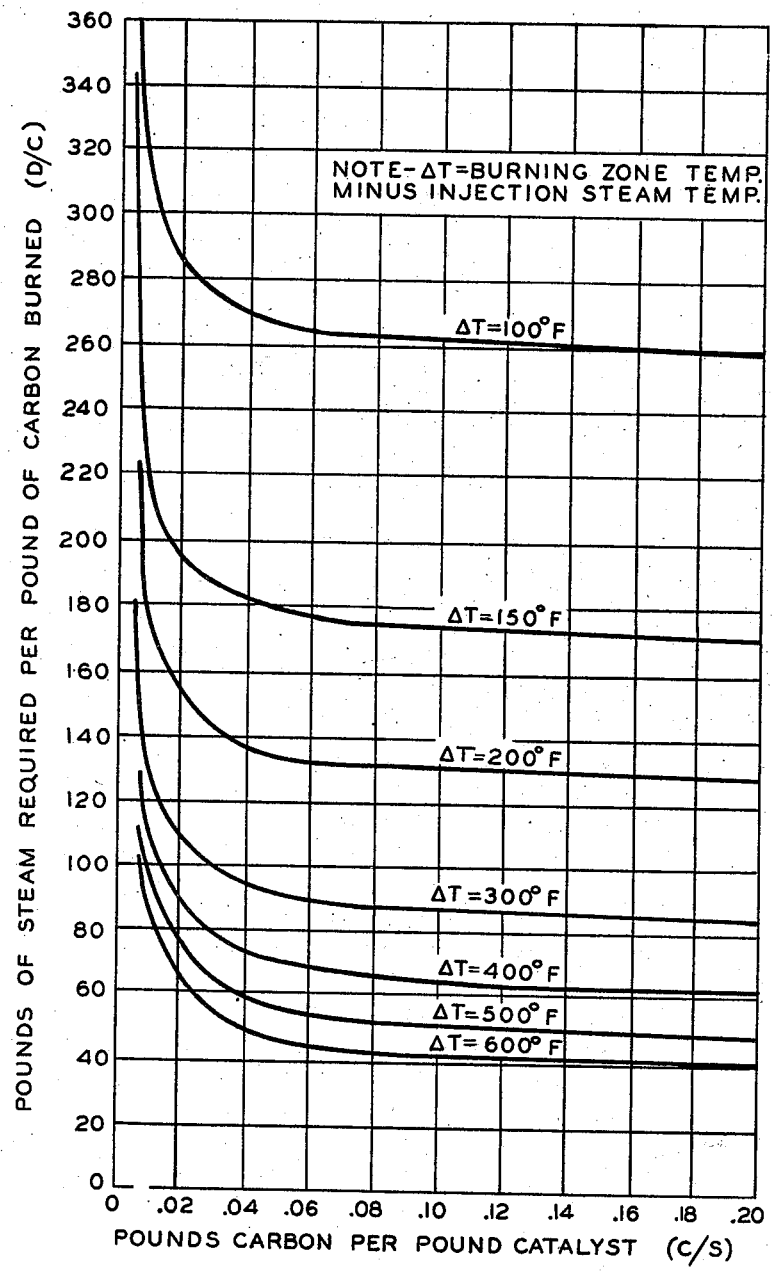
Figure 3:
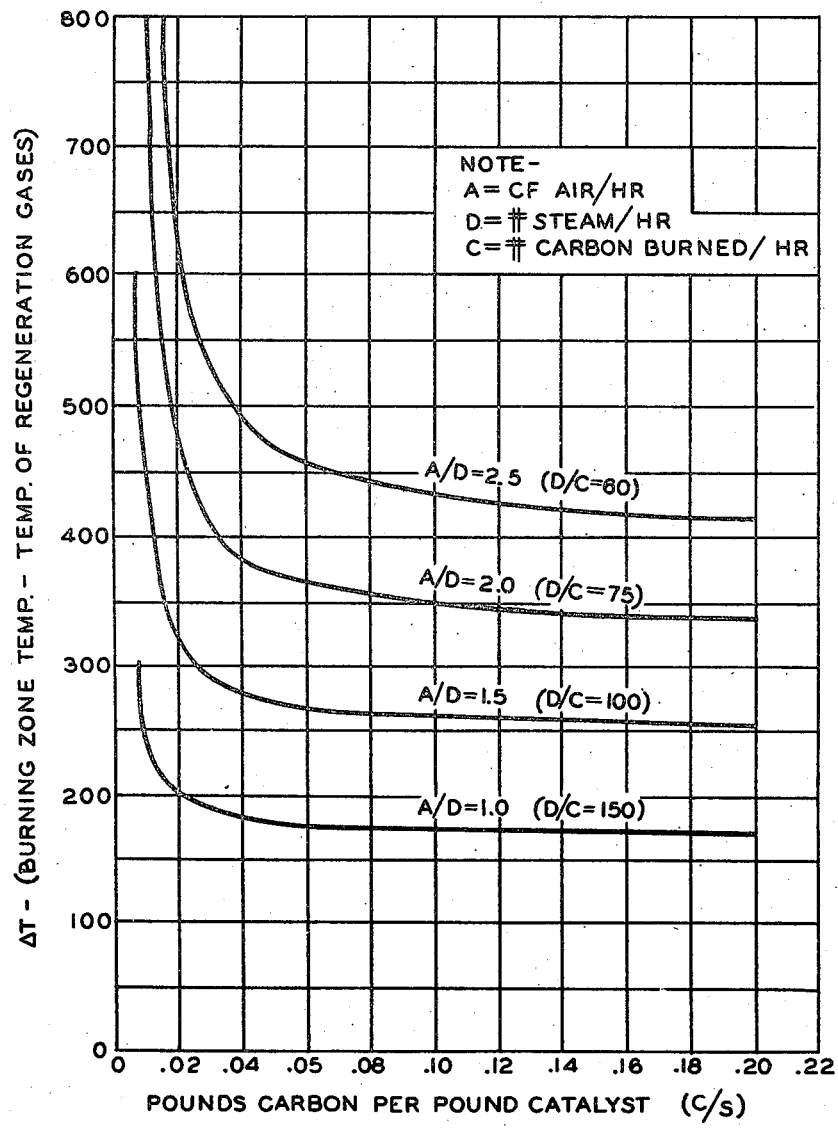

In the drawings, Fig. 1 is a simplified diagrammatic view of a system for catalytic hydrocarbon conversion by contact with a fixed bed of catalyst; Figs. 2 and 3 are graphical representations of data plotted in accordance with the present invention.

In Fig. 1, catalyst chamber 1 contains disposed therein a bed of a suitable solid catalyst 2. Hydrocarbon feed is introduced via lines 3 and 4 and contacted with catalyst under conversion conditions and for a period of time which will suffice to deposit on the catalyst the proportion of carbon desired, which may be determined according to applicants' invention. Reaction products are removed through lines 5 and 6 and flow to suitable fractionation or recovery apparatus, not shown. During the regeneration period, steam, flue gas or other diluent, and air, are introduced through lines 7, 8 and 9, and initially proportioned to give the desired air-diluent or diluent-carbon ratio to be used throughout the regeneration as determined in accordance with the invention described herein. The regeneration gas mixture is preferably introduced into catalyst chamber 1 via line 4, at a temperature sufficient to initiate combustion, and which will be determined in accordance with the desired $\Delta T$ as described herein. Purging may be accomplished prior to and following regeneration by introducing steam or other inert diluent alone for a short period of time. The flow of regeneration gas is continued until the burning zone has traversed the catalyst bed, and regeneration is complete. Where continuous operation is desired, the time of regeneration will usually be coordinated with a process or conversion period being simultaneously conducted in a similar chamber so that the body of regenerated catalyst will be ready to receive hydrocarbon feed diverted from the other chamber while the regeneration gas may likewise be diverted to said other chamber to regenerate spent catalyst therein.

Spent regeneration gas is removed via lines 5 and 10 and may be utilized for purposes of heat exchange or for the utilization of combustible gases or $CO_2$ contained therein. Regeneration may be conducted at any desired pressure. Ordinarily pressures of 0 to 100 pounds per square inch gage may be used.

The application of the above equation is shown graphically in Figure 2, in which the use of steam-air mixtures for regeneration of a bauxite catalyst is illustrated. In plotting the curves shown in the figure: D-pounds of steam per hour (specific heat or $h_D$ of steam=0.54 B. t. u. per pound per °F.); K=3.15 (150 cu. ft. of air required to burn one pound of carbon, specific heat of flue gas=0.021 B. t. u. per cu. ft. per °F.); C=pounds of carbon removed per hour; S=pounds of bauxite regenerated per hour (specific heat of bauxite= 0.27 B. t. u. per lb. per °F.).

By substituting in basic Equation 1 we have the equation (2)

$$(2) \quad \frac{C}{S} = \frac{\frac{0.27}{0.54}}{\frac{D}{C} - \frac{14{,}150 - 3.15\Delta T}{0.54\Delta T}}$$

Since the theoretical amount of air required to burn a pound of carbon is known (150 cu. ft.), the ratio $D/C$ at the same time gives the ratio of diluent to air required to compose the regeneration gas. Where conditions are such that substantial water gas reaction takes place the total amount of air required to burn a pound of carbon will be somewhat lower. For most purposes the figure 150 cubic feet will be satisfactory and the ratio of diluent to air in pounds of steam per cubic foot of air may be determined by substituting in the ratio $D/C$. Even though substantial water-gas reactions should take place during regeneration, and even though these reactions are endothermic, in the relatively narrow burning zone reaction to $CO_2$ is complete, and it is here that maximum temperatures are present which if excessive produce deleterious effects. The use of less than the theoretical amount of air will aid in maintenance of regeneration temperatures on the safe side.

An examination of the curves illustrated in Figure 2 clearly shows the relationship between carbon concentration and the steam-air ratio which must be maintained in order to maintain a given maximum ΔT. It is also clearly shown that for a carbon lay-down of less than 0.02 or 2%, the amount of steam required to maintain ΔT rises very sharply, so that as a matter of practicality of operation, a carbon concentration of at least 2% must be put down during the process period and preferably more than about 4%. These curves illustrate the actual steam requirements for given carbon concentrations and ΔT's, and clearly demonstrate why the prior art has been unable to operate regeneration processes and control temperature without supplementary introduction of diluent. Thus, for carbon-catalyst ratios greater than about 4%, the extra amount of steam required to maintain a substantially predetermined ΔT is a small percentage of the minimum required to remove the heat of combustion only and represents the optimum operating conditions. Below about 2%, the steam requirements increase so rapidly with decreasing carbon concentration that a major portion of the total steam requirement is that necessary to cool catalyst from the burning zone temperature to the desired maximum temperature, and is a total loss from an economic standpoint. The effect of low carbon concentrations at a given air-steam ratio upon the maximum regeneration temperature, or upon ΔT, is strikingly shown in Figure 3 where ΔT is plotted against carbon-catalyst ratio for a given range of air-steam ratios, using a bauxite catalyst. These curves show that for any given air-steam ratio, for carbon concentrations of less than 2%, the temperature begins to rise very rapidly, while for a carbon concentration of more than 2%, a predetermined ΔT may be readily maintained, using a given air-steam ratio throughout the regeneration. In actual operation, however, it is known that it is ordinarily not possible to obtain absolutely uniform carbon deposition on the catalyst, hence when regenerating after a carbon lay-down of less than about 2%, using a constant air-steam ratio, it is almost impossible to prevent development of hot-spots in the catalyst bed. As shown by the curve in Figure 3, small variations in carbon concentration, with an average lay-down of less than 2% will produce great variations in temperature and will result in "peaking" and in temperature conditions which cannot be controlled except by subsequent introduction of diluent. Since temperature indicating instruments cannot be placed at every point in the bed, it is usually impossible to tell exactly where diluent is required.

While the above description and calculations have been based on the use of steam as a diluent, other diluents such as flue gas, nitrogen, etc. may be used, and will show substantially the same phenomena when plotted as is shown in Figures 2 and 3. Using flue gas as the diluent instead of steam, the curves obtained in plotting the equation will have essentially the same shape as those for steam, becoming asymptotic to D/C or ΔT at a definite minimum carbon concentration which is approximately of the same order on a volume basis.

In any event, it has been found that whatever the inert diluent may be, the equation referred to, and curves obtained therefrom, may be satisfactorily applied provided carbon concentrations are deposited which are greater than those at which the curve plotted for carbon becomes asymptotic to the axis defining D/C or ΔT. For air-steam ratios of about 1 to 1 to about 3 to 1 which represent oxygen concentrations of about 1 to 3 per cent the minimum carbon concentration will range from about 1 to 2 per cent as shown by Figure 3, and as a practical matter it is undesirable to deposit less than 2 per cent carbon in order to obtain a uniform maximum temperature.

Using flue gas as a diluent, with oxygen concentrations of about 1 to 3 per cent, the curve tends to become asymptotic over about the same range of carbon concentrations. For this range of oxygen concentrations, the curve begins to rise rapidly at 2 per cent or less carbon so that for practical purposes 2% is a desired minimum. At carbon concentrations of greater than 4 per cent the curve becomes substantially flat and this represents the most desirable minimum carbon.

The following specific examples illustrate the operation of the process:

Example I

A Mid-Continent gas oil of 35.6° A. P. I. is catalytically cracked by contact with a stationary bed of 8–14 mesh bauxite catalyst containing 2,000 lbs. of catalyst at a temperature of 1,000° F. It is desired to regenerate at a maximum temperature of 1,400° F. using a regeneration gas comprising air and steam introduced into the regeneration zone at 1,100° F. The length of each conversion period is two hours, and the total cycle time, including conversion and regeneration, four hours. The flow rate and rate of conversion is such that 5% carbon is deposited on the catalyst during each conversion period.

Substituting in Equation 2

$$\frac{D}{C} = \frac{\frac{0.27}{0.54}}{\left[\frac{14{,}150 - 3.15(1400 - 1100)}{.54(1400 - 1100)}\right]} = 0.05, \frac{D}{C} = 91.5$$

Thus 91.5 lbs of steam are required for every pound of carbon to be removed. To remove 5% carbon from 2,000 lbs. of catalyst in two hours would require 4,575 lbs. of steam per hour. Since 150 cu. ft. of air are theoretically required to burn off each pound, the regeneration gas mixture should comprise 4,575 pounds of steam and 7,500 cubic feet of air per hour, or an air-steam ratio of 1.64 to 1.

The catalyst bed was regenerated with the air-steam mixture thus determined, and the maximum recorded temperature in the bed during regeneration was 1390° F. Allowing for slight inaccuracy of the thermocouple or for some water-gas reaction, this temperature was substantially that calculated.

Example II

A synthetic silica-alumina catalyst was prepared by forming a hydrous silica gel and activating it with an aqueous aluminum chloride solution followed by washing and drying. The catalyst was placed in a chamber forming a bed three feet in diameter and about six feet in length. The bed contained about 2,000 pounds of catalyst.

A polyformed gasoline was subjected to a cracking-aromatizing treatment at a temperature of about 1,100° F. until the catalyst contained 9.9% carbon by weight of catalyst. Previous tests had demonstrated that the catalyst could be regenerated at temperatures as high as 1,425° without substantially damaging its capacity for reuse in this operation. It was, therefore, desired to regenerate without exceeding this temperature using an optimum ratio of steam to air continuously throughout the regeneration. In accordance with the above mentioned equation it was calculated that for an initial regeneration temperature of 1,100° F. an air steam ratio of about 1.86 should be used. A steam supply of 2,680 pounds per hour was readily available and from this it was calculated that a flow of 4,990 cubic feet of air per hour would give the desired ratio. The regeneration was carried out under the above conditions with the temperature and concentration of the incoming regeneration gas being maintained constant. The calculated $\Delta T$ was 320° F., the calculated maximum temperature being 1,420° F. Temperature readings were taken at various points in the bed, and the maximum recorded temperature was 1,410° F. No additional diluent or other temperature control expedient was required. The difference of 10° was within the limits of error of the thermocouples used. Regeneration was substantially complete in about 5 hours, somewhat less than the theoretical total amount of air and steam being required due to water gas reactions. In making the calculations, the specific heat of the catalyst was taken as 0.22 and its density as 51 pounds per cubic foot.

The maximum recorded temperature was 1,420° F., and the temperature curve was substantially horizontal at this temperature throughout the regeneration indicating that temperatures were automatically maintained at the desired level by proper coordination of the critical factors in accordance with the present invention.

*Example IV*

A synthetic gel-type silica-alumina catalyst used for cracking of a 25° A. P. I. gas oil contains 8 per cent carbon based on weight of catalyst. It was desired to regenerate at a maximum temperature of 1,200° F. using a flue gas-air mixture containing 1.5% oxygen, or having an air-diluent ratio of about 0.93 cubic foot of air per pound of flue gas. From the equation $\Delta T$ is determined as 339° F., the specific heat of the catalyst being 0.22 and that of the flue gas being 0.021. From the $\Delta T$, the temperature at which the regeneration gas should be introduced during the regeneration is determined as 861° F. The regeneration was carried out in accordance with the above conditions and the maximum recorded temperature was 1,195° F.

The following table presents further actual data on operations in accordance with the present invention. This data was obtained using a catalyst bed containing 2,000 pounds of catalyst using steam-air mixtures for regeneration. Substantial agreement between calculated and recorded temperatures was obtained over a wide range of carbon concentrations.

| Catalyst | $\frac{C}{S}$ | $\frac{D}{A}$ | Cu. Ft. Air/Hr. Per 1000# Steam | Initial Regen. Temp. | Calc. Max. Temp., °F. | Recorded Max. Temp., °F. |
|---|---|---|---|---|---|---|
| Bauxite | 0.1082 | 0.455 | 2,200 | 1,000 | 1,380 | 1,350 |
| Do | 0.1199 | 0.44 | 2,280 | 1,000 | 1,390 | 1,370 |
| Do | 0.1519 | 0.417 | 2,400 | 1,000 | 1,405 | 1,415 |
| Do | 0.0402 | 0.625 | 1,600 | 1,000 | 1,305 | 1,310 |
| Do | 0.0399 | 0.835 | 1,200 | 1,000 | 1,225 | 1,220 |
| Silica-Alumina | 0.044 | 1.32 | 753 | 1,040 | 1,176 | 1,190 |
| Bauxite | 0.206 | 0.52 | 1,934 | 1,100 | 1,423 | 1,410 |
| Do | 0.107 | 0.504 | 1,988 | 1,090 | 1,432 | 1,420 |

*Example III*

A bed of 8–14 mesh bauxite catalyst containing 2,000 pounds of bauxite was utilized for the cracking-aromatization of a polyform gasoline produced by polyforming a low end point straight run naphtha. The process portion of the cycle was carried out at about 1,100° F. and with a flow rate of about 8 barrels of feed per ton of catalyst per hour. Steam diluent was added at a ratio of one pound of steam per 6 pounds of gasoline feed, and pressure was maintained at about 85 pounds per sq. in. (gage) during reaction as well as during regeneration. It was desired to regenerate at a maximum temperature of 1,425° F. using an air-steam mixture flowing at the constant rate and ratio of 6,830 cubic feet of air per hour and 3,490 pounds of steam per hour, heated to a regeneration inlet temperature of 1,090° F. $\Delta T$ is 335° F. and from the equation the carbon to catalyst ratio was determined as 0.129. The process portion of the cycle was then operated for a period of time sufficient to deposit this concentration of carbon, or 257 pounds based on the weight of catalyst in the chamber. This required a process period of three hours. Regeneration was then carried out using the air-steam mixture described above and temperature recordings were made at spaced points in the bed as a check on maximum temperatures obtained.

In operations with a bauxite catalyst a preferred range of maximum regeneration temperatures has been found to be from 1100 to 1500° F. Initial regeneration temperatures of 700° F. or higher may be used with steam as a diluent, air-steam ratios of from 1 to 1 to 3 to 1 are preferred and carbon concentrations of four per cent or more have been found to readily permit regeneration at a substantially constant maximum temperature throughout the catalyst bed.

The invention described herein is applicable to moving catalyst beds as well as fixed catalyst beds as the heat transfer problems therein are related. Other catalysts and diluents may be used and their proportions readily correlated in accordance with the invention described above as will be apparent to one skilled in the art in view of the above disclosure.

We claim:

1. A process for the regeneration of elongated beds of solid catalysts deactivated by deposition of carbonaceous material thereon at the maximum permissible temperature which said catalyst can withstand without permanent impairment of its activity, which comprises passing through from one end to the other end of such a bed containing C pounds of carbon a regeneration gas comprising oxygen and an inert diluent maintained in constant proportions throughout said regeneration until sufficient oxygen has passed therethrough to effect combustion of the carbon on said catalyst by passage of a narrow burning zone entirely through said bed, the total heat of combustion being removed as sensible heat of spent regeneration gas, the regeneration gas entering said bed at a constant inlet temperature and containing a total amount of diluent D during the entire regeneration period in accordance with the equation $$\frac{C}{S} = \frac{\frac{h_S}{h_D}}{\frac{D}{S} - \frac{Q - K\Delta T}{h_D \Delta T}}$$

where C=the weight of carbon deposited; S=weight of catalyst; $h_S$=the specific heat of the catalyst; $h_D$=the specific heat of the diluent; D=weight of the diluent; Q=the heat of combustion of carbon; $\Delta T$=the temperature difference between the said maximum permissible temperature and the inlet temperature of the regeneration gas; and K=a constant which is equal to $$h_F \frac{F}{C}$$

where $h_F$ is the specific heat of the spent regeneration gas or flue gas produced in the combustion zone and F is the volume of flue gas produced in burning C weight of carbon with the volume of oxygen required for complete combustion thereof; the carbon deposition being sufficient that C/S is greater than the asymptote of said equation with respect to $\Delta T$ for a given value of D/C, thereby effecting regeneration of said catalyst at a burning zone temperature equal to said maximum permissible temperature for said catalyst, but avoiding a temperature in excess of said maximum temperature at any point in said bed during said regeneration.

2. An improved process for the catalytic conversion of hydrocarbons in which an elongated bed of solid catalyst is alternately contacted with hydrocarbons under conversion conditions causing deposition of carbonaceous material thereon and with oxygen to remove said carbonaceous material by combustion, which comprises passing through such a bed a stream of hydrocarbons under such conversion conditions and for such a time to deposit at least 0.02 pound carbon per pound of catalyst, then purging hydrocarbons from said catalyst bed, then regenerating said catalyst bed at the maximum permissible temperature which said catalyst can withstand without permanent impairment of its activity by passing through said bed from one end to the other end thereof a regeneration gas comprising oxygen and an inert diluent maintained in constant proportions throughout said regeneration until sufficient oxygen has passed therethrough to effect combustion of the carbon on said catalyst by passage of a narrow burning zone entirely through said bed, the total heat of combustion being removed as sensible heat of spent regeneration gas, the regeneration gas entering said bed at a constant inlet temperature and containing a total amount of diluent D during the entire regeneration period in accordance with the equation $$\frac{C}{S} = \frac{\frac{h_S}{h_D}}{\frac{D}{C} - \frac{Q - K\Delta T}{h_D \Delta T}}$$

where C=the weight of carbon deposited; S=weight of catalyst; $h_S$=the specific heat of the catalyst; $h_D$=the specific heat of the diluent; D=weight of the diluent; Q=the heat of combustion of carbon; $\Delta T$=the temperature difference between the said maximum permissible temperature and the inlet temperature of the regeneration gas; and K=a constant which is equal to $$h_F \frac{F}{C}$$

where $h_F$ is the specific heat of the spent regeneration gas or flue gas produced in the combustion zone and F is the volume of flue gas produced in burning C weight of carbon with the volume of oxygen required for complete combustion thereof; thereby effecting regeneration of said catalyst at a burning zone temperature equal to said maximum permissible temperature for said catalyst, but avoiding temperature in excess of said maximum temperature at any point in said bed during said regeneration.

3. A process according to claim 2 in which the said inlet temperature of regeneration gas is maintained at a value substantially equal to the temperature maintained in said bed during said conversion of hydrocarbons.

4. In a process for the catalytic conversion of hydrocarbons in which an elongated bed of solid catalyst is cyclicly contacted alternately with hydrocarbons under conversion conditions in process periods and with oxygen to remove carbon deposits by combustion in regeneration periods and in which the quantity of carbon deposited on the catalyst during the process period changes from time to time depending on the hydrocarbon charge stock and conversion conditions employed, the improved method of conducting such cyclic process so that each regeneration of the catalyst is effected at the maximum permissible temperature which said catalyst can withstand without permanent impairment of its activity while avoiding any temperature in excess of said maximum permissible temperature at any point in the catalyst bed during any regeneration period despite said changing carbon deposits, which comprises conducting each individual regeneration period at a regeneration gas inlet temperature which is maintained constant during said period and at a ratio of diluent to oxygen which is maintained constant during said period, and, after each process period in which a changed amount of carbon has been deposited, immediately adjusting the inlet temperature and diluent-oxygen ratio of the regeneration gas to values required by the equation given herein below and proceeding with the regeneration of the catalyst while maintaining said adjusted values constant throughout the given regeneration period, the inlet temperature and diluent-oxygen ratio of each regeneration period being in accordance with the equation $$\frac{C}{S} = \frac{\frac{h_S}{h_D}}{\frac{D}{C} - \frac{Q - K\Delta T}{h_D \Delta T}}$$

where C=the weight of carbon deposited; S=weight of catalyst; $h_S$=the specific heat of the catalyst; $h_D$=the specific heat of the diluent; D=weight of the diluent; Q=the heat of combustion of carbon; $\Delta T$=the temperature difference between the said maximum permissible temperature and the inlet temperature of the regeneration gas; and K=a constant which is equal to $$h_F \frac{F}{C}$$

where $h_F$ is the specific heat of the spent regeneration gas or flue gas produced in the combustion zone and F is the volume of flue gas produced in burning C weight of carbon with the volume of oxygen required for complete combustion thereof; the carbon deposits being sufficient in each process period that C/S is greater than the asymptote of said equation with respect to ΔT for a given value of D/C, whereby the total heat of combustion of said carbon is removed as sensible heat of spent regeneration gas leaving the catalyst bed and each said regeneration is effected at a burning zone temperature equal to said maximum permissible temperature for said catalyst while avoiding any temperature in excess of said maximum permissible temperature during any regeneration period.

5. A process for the regeneration of an elongated bed of bauxite catalyst deactivated by deposition of carbonaceous material thereon at the maximum permissible temperature which said catalyst can withstand without permanent impairment of its activity, said maximum permissible temperature being about 1400° F., which comprises passing through from one end to the other end of such a bed containing C pounds of carbon a regeneration gas comprising oxygen and steam maintained in constant proportions throughout said regeneration until sufficient oxygen has passed therethrough to effect combustion of the carbon on said catalyst by passage of a narrow burning zone entirely through said bed, the total heat of combustion being removed as sensible heat of spent regeneration gas leaving said catalyst bed, the regeneration gas entering said bed at a constant inlet temperature and containing a total amount of steam D during the entire regeneration period in accordance with the equation $$\frac{C}{S} = \frac{\frac{h_S}{h_D}}{\frac{D}{C} = \frac{Q - K\Delta T}{h_D \Delta T}}$$

where C=the weight of carbon deposited; S= weight of catalyst; $h_S$=the specific heat of the catalyst; $h_D$=the specific heat of the diluent; D=weight of the diluent; Q=the heat of combustion of carbon; ΔT=the temperature difference between the said maximum permissible temperature and the inlet temperature of the regeneration gas; and K=a constant which is equal to $$h_F \frac{F}{C}$$

where $h_F$ is the specific heat of the spent regeneration gas or flue gas produced in the combustion zone and F is the volume of flue gas produced in burning C weight of carbon with the volume of oxygen required for complete combustion thereof; the carbon deposition being sufficient that C/S is greater than 0.04, thereby effecting regeneration of said bauxite catalyst at a burning zone temperature of about 1400° F. while avoiding a temperature in excess of same at any point in said bed during said regeneration.

ROY E. VINYARD.
WENDELL W. ROACH.
BRADLEY SKINNER.

REFERENCES CITED

The following references are of record in the file of this patent:

UNITED STATES PATENTS

| Number | Name | Date |
|---|---|---|
| 2,253,486 | Belchetz | Aug. 19, 1941 |
| 2,290,580 | Degnen et al. | July 21, 1942 |
| 2,348,557 | Mattox | May 9, 1944 |
| 2,404,595 | Richker et al. | July 23, 1946 |
| 2,408,948 | Ocon et al. | Oct. 8, 1946 |